United States Patent [19]

Smith

[11] Patent Number: 4,470,701

[45] Date of Patent: Sep. 11, 1984

[54] DISPERSION EQUALIZED RING LASER GYROSCOPE

[75] Inventor: Irl W. Smith, Newton, Mass.

[73] Assignee: Raytheon Company, Lexington, Mass.

[21] Appl. No.: 509,009

[22] Filed: Jun. 29, 1983

Related U.S. Application Data

[63] Continuation of Ser. No. 197,870, Oct. 17, 1980, abandoned.

[51] Int. Cl.³ .......................... G01C 19/64; G02F 1/09
[52] U.S. Cl. ............................. 356/350; 350/276 SL; 350/375; 372/94; 372/103
[58] Field of Search ........................ 356/350, 351, 703; 372/19, 33, 94, 103, 105, 106; 350/276 SL, 375, 392

[56] References Cited

U.S. PATENT DOCUMENTS

| | | |
|---|---|---|
| 3,642,373 | 2/1972 | Catherin ........................... 356/350 |
| 3,973,851 | 8/1976 | Ferrar ........................ 356/106 LR |
| 4,110,045 | 8/1978 | Smith, Jr. et al. ................. 356/350 |
| 4,213,705 | 7/1980 | Sanders ........................... 356/350 |
| 4,247,832 | 1/1981 | Sanders et al. ................ 356/350 X |
| 4,284,329 | 8/1981 | Smith et al. ...................... 356/350 |

Primary Examiner—Vincent P. McGraw
Attorney, Agent, or Firm—Richard M. Sharkansky; Joseph D. Pannone

[57] ABSTRACT

A ring laser gyroscope system uses a non-planar path and no-depolarizing Faraday bias means to achieve four-frequency differential operation. The use of the non-planar path eliminates the crystal rotator normally used to provide reciprocal bias and therefore eliminates scattering surfaces and a major cause of thermal sensitivity. The non-depolarizing Faraday means, such as a thin glass slab having a component of magnetic field along the optic axis of the laser, is used to reduce the corresponding thermal sensitivity of the traditional Faraday bias element normally implemented by a crystal such as quartz. Eliminating these major sources of drift then allows higher-order sources of drift to be corrected. Zeeman splitting of the laser gain medium is used to provide an equal amount of dispersion to each of the two counter-travelling waves of each wave pair, thus eliminating small amounts of drift due to the different phase shifts produced in the propagating waves by the gain medium.

2 Claims, 12 Drawing Figures

DISPERSION EQUALIZED RING LASER GYROSCOPE

This application is a continuation of application Ser. No. 197,870 filed Oct. 17, 1980, now abandoned.

BACKGROUND OF THE INVENTION

To be useful, a laser gyro has to overcome the lock-in problem that occurs at low rotational rates. Lock-in is caused by unavoidable scattering of some light from one resonator mode into the other by imperfections of the optical elements comprising the cavity. If the frequencies of the modes are not too different, there is a tendency of the modes to phase lock. For a gyro to be of practical use, it has to overcome this lock-in problem. A two-frequency gyro system may avoid lock-in by biasing the gyro so that it operates with a large output frequency for zero input rotation rate. To avoid problems in bias accuracy, the bias can be dithered so that bias instabilities may be eliminated from the output signal by time averaging. This dither approach, however, causes the gyro to go through lock-in twice per dither cycle. This causes the gyro to partially lose its phase coherence; thus an error of a fractional count is made per dither cycle. These errors add randomly giving a cumulative output angular error which increases with time. A four-frequency differential laser gyro system solves this problem by essentially operating two independent gyros in a single stable resonator sharing a common optical path, but statically biased in opposite senses by the same passive bias elements. In the differential output of these two gyros, the bias cancels while any rotation generated signals add, thereby giving a sensitivity twice that of the single two-frequency gyro and avoiding problems due to drifts in the bias. The four different frequencies are normally generated by using two different optical effects. First, a crystal polarization rotator is used to provide a direction-independent polarization causing the resonant waves to be nearly right-hand circularly polarized (RCP) and left-hand circularly polarized (LCP). The polarization rotation results from the refractive index of the rotator medium being slightly different for RCP and LCP waves. Second, a Faraday rotator is used to provide non-reciprocal polarization rotation, by having a slightly different refractive index for clockwise travelling waves than for counter-clockwise travelling waves. This causes the cw and ccw RCP waves to oscillate at slightly different frequencies while the cw and ccw LCP waves are similarly but oppositely split. This Faraday rotator may be a separate optical element consisting of a piece of optically isotropic material subjected to a longitudinal magnetic field, or it may be realized by applying such a magnetic field to the crystal rotator. Thus, there is a laser gyro operating with right circular polarization biased in one direction of rotation and another with left circular polarization biased in the opposite direction, the bias being cancelled by subtracting the two outputs. The operation of a basic four-frequency laser gyroscope is described in K. Andringa U.S. Pat. No. 3,741,657 issued June 26, 1972 and assigned to the present assignee.

SUMMARY OF THE INVENTION

The present invention discloses a laser gyro system which recognizes the problems that limit the stability of present laser gyro systems. Ideally, any resultant fluctuation in the differential output of a four-frequency gyro should be cancelled since all four frequencies should be affected equally by external sources, such as thermal expansion. In practice, it has been found that the four frequencies are not equally affected by external sources, resulting in different variations of the frequencies. Thus, even though four-frequency gyros have exhibited excellent performance levels under conditions of thermal equilibrium, the practical application of these instruments has, so far, been limited by the presence of thermal sensitivities manifested as unacceptable long-term bias drifts.

The present invention discloses a laser gyro system which substantially reduces sources of drift, and thus reduces the overall gyro output drift by several orders of magnitude over other laser gyro systems. One of the primary sources of drift is the frequency pulling resulting from the mutual interaction of two resonant modes due to coupling from any existing scatter sources, which are generally environmentally dependent. Another important source of drift is the scatter-induced drift which is due to the relative motion of scatter centers in the cavity. Additionally, there is a dispersion-induced drift which is due to variation in time of the gain medium, which causes differential variations in the dispersion, or phase shift, seen by each resonant frequency. A further source of drift will be referred to as the Fresnel-Fizeau effect and is due to the dependence of the refractive index of the gas discharge on the velocity distribution of the discharge sampled by the laser modes, since it may vary as the modes move in response to fluctuations of the ring cavity. These sources of drift are present in all laser gyros, and are generally caused by changes in the optical path length due to environmentally induced changes in the cavity or the optical elements in the cavity. The laser gyro of the present invention substantially reduces these drifts by minimizing physical motions of the cavity by using ultra-low-expansion materials, by minimizing changes in effective optical path length by reducing the amount and limiting the type of intracavity elements, by reducing the scatter of all the elements, and by using purely circularly polarized cavity modes.

A non-planar path is used instead of the traditional crystal rotator to provide the frequency split between LCP waves and RCP waves. A thin Faraday paramagnetic glass slab is used instead of the traditional thick Faraday rotator to provide for the non-reciprocal split between the cw and cww waves. Use of a non-planar path not only eliminates a major source of scattering (the crystal rotator) which produces coupling between the different waves, but also provides good circular polarization. Use of a glass Faraday rotator avoids elliptical birefringence and thus maintains the circular polarization. This further eliminates coupling among the different waves since a perfectly LCP wave on reflection will become an RCP wave and thus it will not couple into the counter-rotating wave. Use of the minimum rotator slab's thickness that achieves a predetermined amount of rotation ensures a minimal temperature dependence of any scattering centers introduced by the slab. This integrated approach in creating and maintaining circular polarization eliminates the sources of large amounts of drift due to coupling among the waves and results in a more accurate laser gyro.

The next performance limitation is then brought about by small amounts of drift due to higher-order effects. The system of the present invention can now advantageously use Zeeman splitting of the gas laser mixture to equalize the dispersion seen by each wave of the counter travelling pairs. This allows the difference output to be stable as the four-frequency waves experience small frequency variations placing them on different portions of the non-linear dispersion curve.

The present invention discloses a laser gyro system which employs means coupled to a re-entrant resonant path, for providing compensation to electromagnetic waves for gain medium induced changes in phase shift of said waves and means substantially free of scattering centers for producing circularly polarized counter-travelling waves of different frequencies arranged in pairs of first and second polarization sense. More specifically, the circularly polarization means comprise non-depolarizing means for producing a polarization-dependent phase shift in the waves resulting in a frequency splitting between waves of opposite circular polarization, and non-depolarizing means for producing a direction-dependent phase shift to the waves resulting in a frequency splitting between counter-travelling waves in each of the pairs. The polarization-dependent means may comprise a non-planar resonator and the direction-dependent means may comprise means having a refractive index whose direction-independent component is isotropic. Preferably, the direction-dependent means have a scattering characteristic substantially independent of temperature over the operating temperature range. In the preferred embodiment, the direction-dependent means comprise a slab of isotropic material capable of producing a direction-dependent rotation of the electromagnetic field of said waves in the presence of a magnetic field and having a thickness resulting in a variation of this thickness of substantially less than one wavelength of of the waves over the operating temperature range. Preferably, the magnetic field for producing direction-dependent rotation is localized to the region immediately adjacent said slab. Additionally, the gain-medium phase shift compensating means comprise means for providing a magnetic field longitudinal to the axis of said gain-medium and having a magnitude and polarity for providing substantially the same amount of gain-medium induced phase-shift to the counter-travelling waves of each pair.

This invention further provides for a gyro system comprising means for providing a closed non-planar path for the propagation of circularly polarized electromagnetic waves and also for providing a splitting in frequency to waves of opposite polarization sense, a gain medium disposed in the path, non-depolarizing means for providing a direction-dependent phase shift to the circularly polarized waves resulting in a frequency splitting between counter-travelling ones of the waves of each polarization sense and means for compensating for unequal gain medium dispersion of the counter-travelling waves. The invention also provides for scattering particles removing means which comprise a baffle in the region of electrodes. Additionally, the direction-dependent non-depolarizing means comprise a slab of isotropic material having a non-zero Verdet constant and means for providing a magnetic field in the slab, preferably, absorbing means are used to collect any reflected waves. The dispersion compensation means comprise means for providing a component of magnetic field in the gain medium along its longitudinal axis, and having field components of sufficient magnitude for producing a frequency splitting of the gain and dispersion characteristics substantially equal to the frequency splitting between the counter-travelling waves due to the non-depolarizing means. The magnetic field component also has a polarity for providing substantially equal amounts of gain-medium dispersion to the counter-travelling waves. More specifically, the magnetic field providing means vary the magnetic field as a function of the average amount of frequency splitting of counter-travelling waves due to the direction-dependent non-depolarizing means. In one preferred embodiment, the magnetic field providing means comprise at least one coil around a portion of the gain-medium containing path, means for measuring the amounts of frequency splitting generated in counter-travelling waves by the direction-dependent non-depolarizing means, and means for producing a current in the coil proportional to the average value of the frequency split. This invention further provides for a Faraday rotator comprising a supporting shell, means for providing Faraday rotation disposed within the shell and means for absorbing electromagnetic waves disposed on at least one side of the Faraday rotation means for allowing a substantial portion of the waves to pass through the Faraday rotation means which are further positioned to direct any reflected portion of the waves toward the absorbing means.

BRIEF DESCRIPTION OF THE DRAWINGS

Other and further objects and advantages of the invention will become apparent as the description thereof progresses, reference being had to the accompanying drawings in which like numbers refer to like elements and wherein.

DESCRIPTION OF THE PREFERRED EMBODIMENTS

Referring simultaneously to the views of FIGS. 1-5, the construction and operation of a laser gyroscope system in accordance with the teachings of the present invention will be described. Gyro block 102 forms the frame upon which the system is constructed. Gyro block 102 is preferably constructed with a material having a low thermal coefficient of expansion such as a glass-ceramic material to minimize the effects of temperature change upon the laser gyroscope system. A preferred commercially available material is sold under the name of Cer-Vit TM material C-101 by Owens-Illinois Company; alternatively Zerodur TM by Schott may be used.

Gyro block 102 has nine substantially planar faces as shown in the various views of FIGS. 1-4. As shown most clearly in the views of FIGS. 3 and 4 which show gyro block 102 without the other components of the system, passages 108, 110, 112 and 114 are provided between four of the faces of gyro block 102. The passages define a non-planar closed propagation path within laser gyro block 102.

Figure 3:
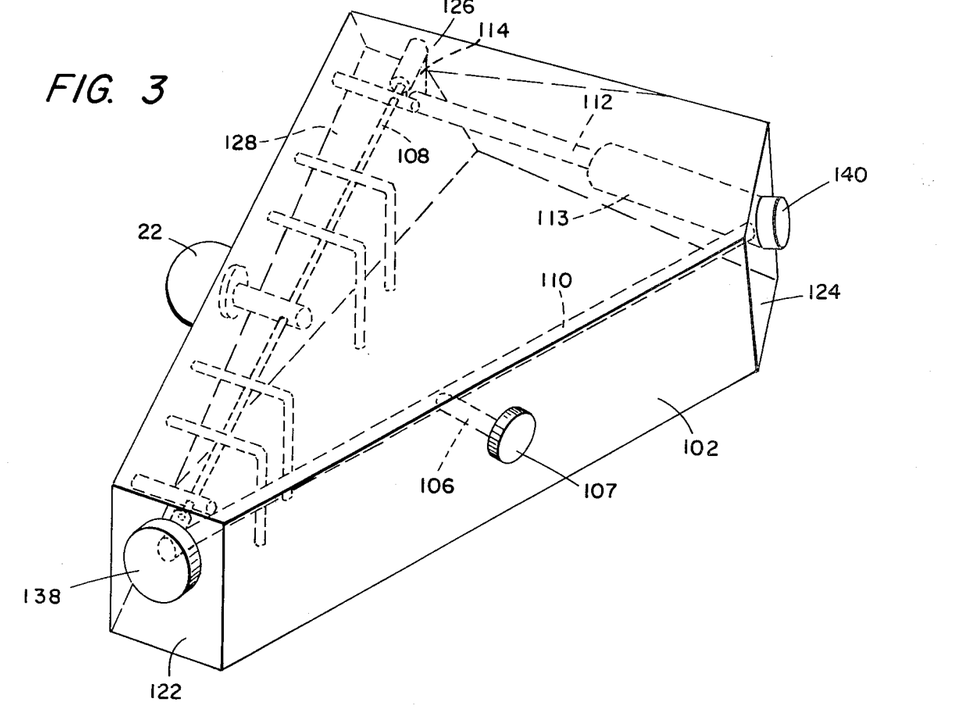
FIGS. 3 and 4 are isometric views of the gyro block taken from a third corner of the device shown in FIG. 1 showing the internal construction and passages of the device therein.
Figure 4:
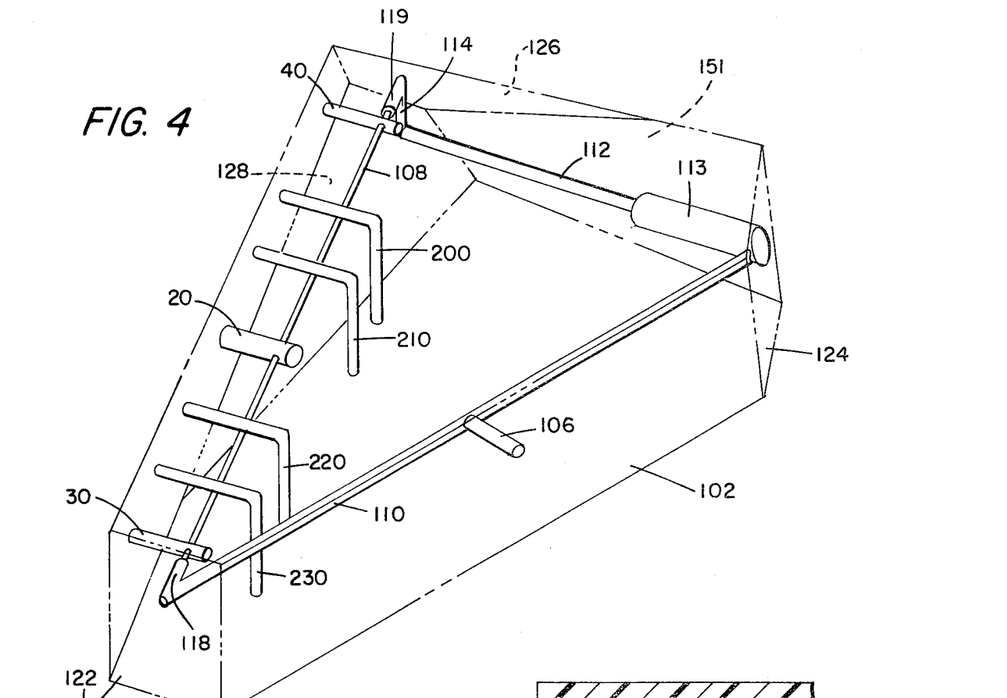

Mirrors are provided upon faces 122, 124, 126 and 128 at the intersections of the passages with the faces. Substrates 140 and 142 having suitable reflecting surfaces comprise the mirrors positioned upon faces 124 and 126 respectively. A mirrored surface is also provided directly adjacent face 128 in the front of path length control transducer 160. One of these mirrors should be slightly concave to insure that the beams are stable and confined essentially to the center of the passages. Also, a transparent mirror substrate 138 having partially transmitting dielectric mirror layers 139 is provided upon face 122 to allow a portion of each beam travelling along a closed path within the gyro block 102 to be coupled into output optics 144. The structure of output optics 144 is disclosed in I. Smith et al U.S. Pat. No. 4,141,651 issued Feb. 27, 1979, and assigned to the present assignee.

Because passages 108, 110, 112 and 114 define a non-planar propagation path for the various beams within the system, each beam undergoes a polarization rotation as it passes around the closed path. Ideally, only beams of substantially circular polarization exist in the non-planar cavity of the invention. With circularly polarized beams, drift due to beam scattering or coupling from one beam to the other is minimized. This reduction occurs because light of one circular polarization state when scattered is not of the proper polarization to be coupled into and affect the other beams. For other types of light polarization, this is not the case because there will always be some component of the scattered beam which will couple to other beams.

Figure 8A:
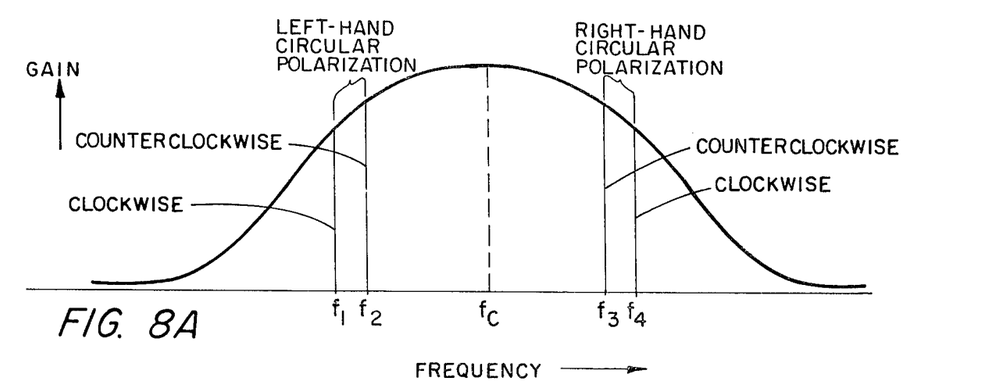
FIG. 8A is a graph showing the gain versus frequency of the gaseous laser medium employed with the laser gyro system of FIG. 1 indicating the relative positions of the frequencies of the four beams within the system.

In the preferred embodiment, the passages and reflecting mirrors are so arranged as to provide a substantially ninety-degree polarization rotation for the various beams. Because beams of right and left-hand circular polarization are rotated in opposite senses by this same amount, independent of their direction of propagation, a frequency splitting between beams of right and left-hand circular polarization must occur in order for the beams to resonate within the optical cavity. This is shown in FIG. 8A as the frequency split between the beams of left-hand and right-hand circular polarization. In the preferred embodiment, a ninety-degree rotation corresponding to a 180 degree relative phase shift is employed although other phase shifts as well may be used depending upon the frequency separation desired. Polarization rotation will occur as long as the closed propagation path is non-planar. The precise arrangement of the paths will determine the amount of rotation.

In the known systems of the prior art such as that described in the above-referenced patent to K. Andringa, the frequency splitting between beams of right and left-hand circular polarization was accomplished with the use of a block of solid material of significant optical thickness disposed in the propagation path. The presence of any solid material directly in the path of beam propagation provides scattering centers from which light may undesirably be coupled from one beam to another causing an error in the gyro output. The amount of coupling, and thus the error, is thermally very sensitive. Hence, the output frequency of such devices was subject to a temperature dependent drift which could not be compensated for with a fixed output bias. Additionally, a crystal rotator introduces an amount of stress-birefringence which tends to depolarize the circularly polarized waves, further contributing to unwanted coupling of the waves. This results in a gyro system having a variation in time of the output frequency of the order of, at best, tens of Hz and reaching hundreds of Hz in many cases. With the present invention, the solid material which had been used for the crystal rotator has been completely eliminated from the beam propagation path thereby eliminating the sources of error and drift associated with the material.

To aid in understanding how the phase shift occurs, it is useful to imagine a linearly polarized beam propagating around the path. In this description, the 180° phase-shift experienced by an electromagnetic wave upon reflection is ignored. Since an even number (four) of such reflections is employed, no error is thereby incurred. Suppose, for example, that the beam travelling in passage 110 between face 122 and face 124 is linearly polarized with the electric vector pointing in the upper direction. As the beam is reflected from the mirror provided upon face 124, the electric vector is still nearly pointed upward but with a slight forward tilt because passage 112 drops between face 124 and face 128. As the beam is reflected from the mirror upon face 128, it will be pointing nearly to the left with a slight downward tilt as would be seen in FIGS. 3 and 4. As the beam is reflected from face 126, the electric vector of the beam within passage 108 would point to the left with a slight upward slope again in the views of FIGS. 3 and 4. After reflection from face 122, the electric vector of the beam within passage 110 still points leftward and into the plane of the drawing. Thus, it may be seen that the beam as it arrives back in passage 110 has experienced a polarization rotation of approximately ninety degrees. Of course, such a rotated linearly polarized beam cannot reinforce itself and resonate along the closed path. Only circularly polarized beams having a frequency shifted from the frequency at which such beams would resonate for a planar closed path of the same length will be resonant.

A two-frequency laser gyroscope may be constructed using a non-planar propagation path to provide the only frequency splitting. No Faraday rotator or other such element is required in such an embodiment. To detect the rate of rotation, an output signal is produced by beating the extracted portions of the two beams together to form an output signal having a frequency equal to the difference in frequency between the two beams. At rest, the output signal will remain at some value $f_o$. For rotation in one direction, the output signal will increase to a value $f_o + \Delta f$, where $\Delta f$ is proportional to the rate of rotation, and will decrease to a value of $f_o - \Delta f$ for rotation in the other direction. This invention significantly reduces cross-coupling due to backscattering so that the lock-in range diminishes permitting such a laser gyroscope to be used in many applications without complete elimination of lock-in.

Figure 2:
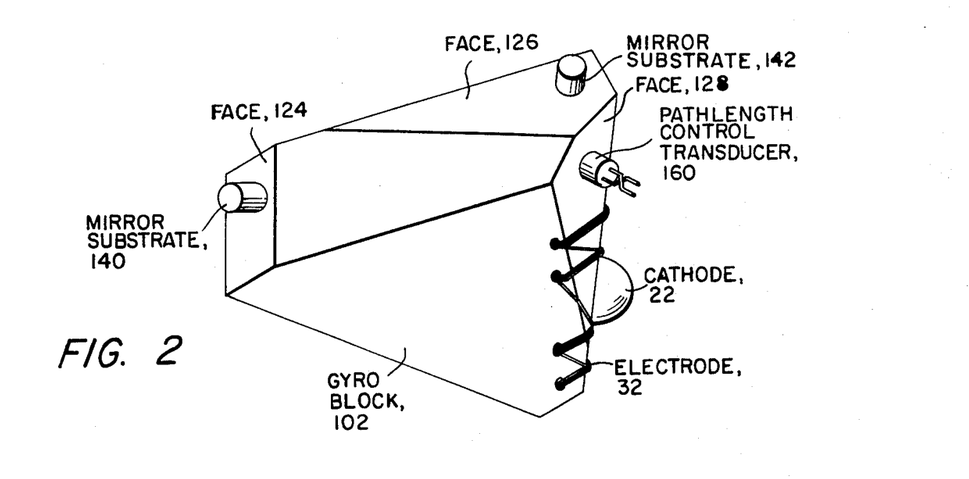
FIG. 2 is a lower isometric view taken from a second corner of the device shown in FIG. 1.
Figure 6:
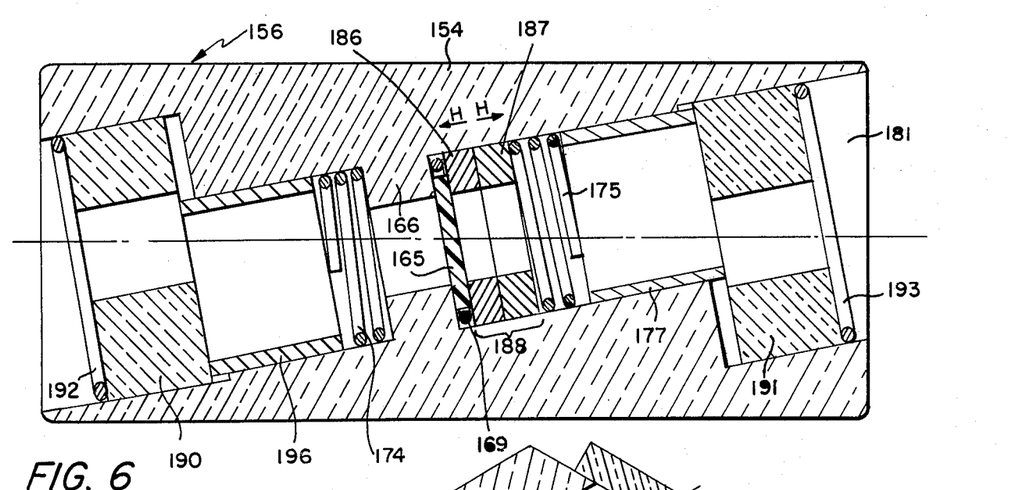
FIG. 6 is a cross-sectional side view showing the details of construction of the Faraday rotator device of the laser gyro system shown in FIG. 1.
Figure 6A:
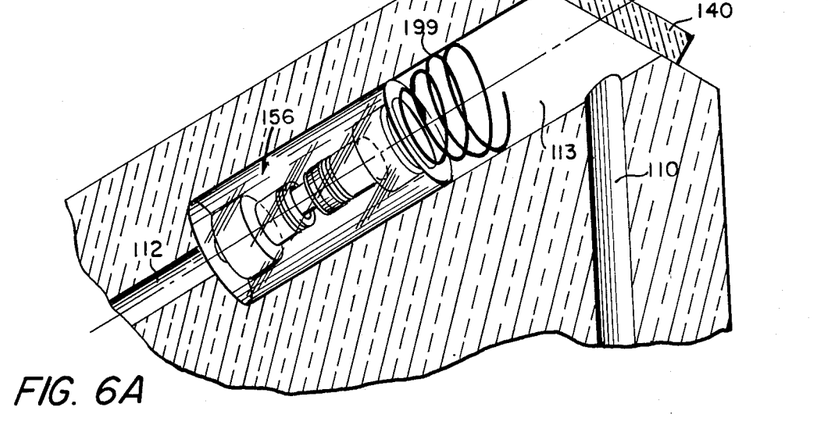
FIG. 6A is a top view of a portion of the laser gyro of FIG. 1 in the region of the Faraday rotator of FIG. 6, and and showing a top view of the Faraday rotator.

Faraday rotator 156 is positioned within a larger diameter portion 113 of passage 112 adjacent face 124 as may be seen in the views of FIGS. 2, 4, and 6A. The details of the construction of Faraday rotator 156 are seen in the views of FIGS. 6 and 6A. The Faraday rotator mount 154, preferably formed of the same material as laser gyro block 102, forms the base upon which the structure is constructed. Rotator mount 154 is cylindrical in shape and has several cylindrical apertures of varying diameter at an angle to the longitudinal axis of mount 154 for providing support at predetermined locations to all the elements of Faraday rotator 156 and for providing a clear path along the longitudinal center axis of mount 154. Faraday rotator slab 165 is positioned on shelf 166 formed by the central portion of mount 154. Ring 169 prevents lateral movement of slab 165. Faraday rotator slab 165 may be preferably formed of a rare earth-doped glass or a material of similarly high Verdet constant. A Verdet constant of magnitude in excess of 0.25 min./cm./Oe. at the operating wavelength is preferred to reduce the thickness of the slab required to produce the desired amount of frequency splitting. Traditional Faraday rotators have employed a thick slab of material, often fused quartz. Any solid material in the path of the counter-rotating beams will introduce scatter points which exhibit a sensitivity to thermal fluxes. This sensitivity may be due to the thermal expansion of the material or to a change in the optical path length due to the temperature dependence of the refractive index of the material. The effective temperature dependence of the optical path length, and therefore the thermally induced drift, has been found to be a strong positive function of the thickness of the solid material in the path of the beams. Thus, it is desirable to use as thin a slab as possible and a thickness of 0.5mm or less is preferred to reduce drift to an acceptable level resulting in a variation of the thickness due to temperature or other causes substantially less than one wavelength of the laser waves over the operating region. A commercially available material is Hoya Optics, Inc. material No. FR-5 which is a glass doped with paramagnetic material to provide for the Faraday rotation and results in a rotator having an isotropic refractive index. This was found to be important since a problem of a traditional Faraday rotator is that a crystal material such as quartz has an anisotropic refractive index which introduces elliptical birefringence. This depolarizes the nominally circularly polarized waves and leads to increased coupling between the counter-rotating waves. Thus, it is important to use an isotropic material for the Faraday rotator to eliminate depolarization of the resonant modes. Operating as close to circular polarization as possible reduces cross-coupling and therefore reduces thermally induced drifts due to any remaining scatter centers. This allows a gyro system to achieve stability levels corresponding to a variation in time of the output frequency of a few Hz or better.

Faraday rotator slab 165 is held against shelf 166 by magnet assembly 188. Two hollow cylindrical permanent magnets 186 and 187 are positioned end-to-end with like poles adjacent one another at the juncture between the two magnets. The two magnets can be fastened together by any known means, such as solder bonding or welding. The Faraday rotator slab 165 is then adjacent one end of the two magnet pair. A longitudinal magnetic field is produced in the slab, but this field attenuates rapidly upon moving a short distance away from the slab or magnets. This embodiment has the advantage that essentially no stray magnetic field is produced which could extend into the gaseous discharge region and, by the Zeeman effect, produce unwanted modes or frequency offset. Alternatively, a single magnet may be used to provide the required magnetic field to the slab. The permanent magnet structure might also be replaced by a few coils of wire to allow an electrical current to establish a magnetic field in Faraday rotator slab 165. Pushing on magnet structure 188 is spring 175. The other side of spring 175 rests along the periphery of hollow cylindrical spacer 197, which in turn rests partially on one side of hollow cylindrical absorber 191. Absorber 191 is made of a material such as black glass and being antireflection-coated is used to absorb any electromagnetic wave, such as the specular reflections from the Faraday rotator slab, incident on its surfaces. Absorber 191 is held in place by circular clip 193, which rests by friction along the periphery of aperture 181. Thus, it can be seen that the elements just described form an assembly positioned by circular clip 193 against the right side of shelf 166, with spring 175 providing a sufficient longitudinal force to keep all the elements tightly in place. On the opposite side of shelf 166, there is a similar arrangement of elements with the exception of Faraday slab 165 and magnet assembly 188. Circular clip 192 forms the stationary base against which a second absorber 190 rests. Spring 174, with one end resting on the left side of shelf 166, pushes spacer 196 against absorber 190 and thus keeps all the elements on the left side of shelf 166 in their predetermined position.

Rotator mount 154 is held in place against the shelf formed by the change of diameter of passages 112 and 113, by helical spring 199. A portion of the first smaller diameter turn of spring 199 rests on the body of rotator mount 154, while the other larger diameter end expands circumferentially and frictionally engages the wall of bore 113. The arrangement of the elements of rotator 156 provides for thermal stability, since the optical elements are elastically held against a stable material used for the gyro block.

As described above, the axes of apertures provided in rotator mount 154 are at an angle with respect to the longitudinal axis of mount 154, and thus the plane of Faraday rotator slab 165 also describes an angle with respect to the longitudinal axis of mount 154. This contributes to the elimination of coupling between counter-travelling waves since any reflections off of the two surfaces of Faraday slab 165 are now intercepted and absorbed by the two black glass absorbers. Waves circulating from left to right in the rotator of FIG. 6 will have a reflection from slab 165 intercepted and absorbed by the lower portion of absorber 190, while waves circulating in the opposite direction will have reflections from slab 165 absorbed by the top portion of absorber 191. The two absorbers, 190 and 191, and rotator slab 165 are also coated with an anti-reflection coating to further reduce the amount of reflections.

Besides providing the frequency splitting between the clockwise and counter-clockwise circulating beams, Faraday rotator 156 performs a second function. Because of the close fit provided in the region of shelf 166, Faraday rotator 156 blocks the longitudinal flow of gas through passage 112. Because there can be no net circulation of gas through the closed path, the possibility of circulation of scatter particles carried by the gas is substantially reduced, as are drifts due to the Fresnel-Fizeau effect.

Figure 1:
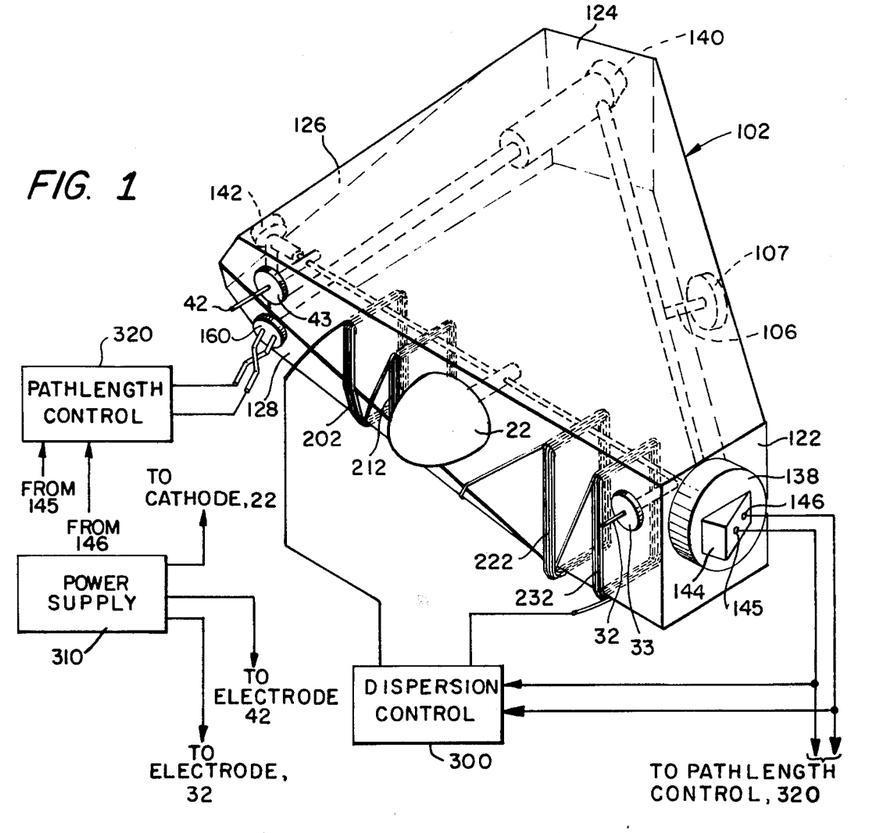
FIG. 1 shows a top isometric view taken from a first corner of a laser gyroscope system of the invention.

Referring again to the views of FIGS. 1, 3 and 4, it may be seen that a low angle of incidence is provided for the beams striking the partially transmitting mirror disposed upon face 122. The beams traveling within each passage 108, 110, 112 and 114 are circularly polarized. The nearer to normally that one of these beams strikes a reflecting mirror or a surface the nearer to circular will be the polarization of the beam transmitted through the mirror surface. As the angle of incidence moves away from the normal, the partially transmitted beams begin to assume an elliptical polarization.

Figure 7:
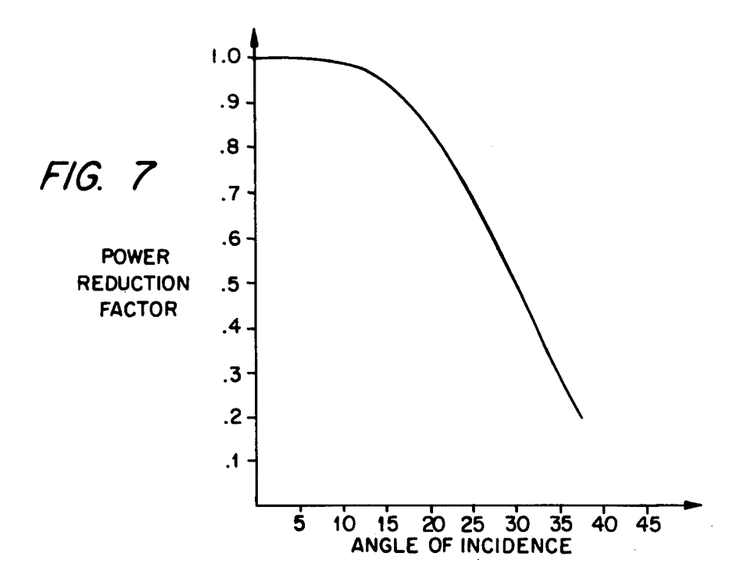
FIG. 7 is a graph showing the power reduction factor as a function of the angle of incidence of beams upon an output mirror structure.

As explained in the above-referenced U.S. Pat. No. 4,141,651, if the beams within the output optics and detector structure are entirely circularly polarized, there will be essentially no unwanted cross-coupling and interference between the beams of the upper two frequencies and the beams of the lower two frequencies within the detector structure. As the amount of ellipticity increases, cross-coupling begins to become evident and appears as an amplitude modulation upon the output signals from detector diodes 145 and 146. As discussed above, it has been discovered that the amount of the unwanted cross-coupling is a nonlinear monotonically increasing function of the degree of ellipticity. It has been found that the cross-coupling is relatively low for angles of incidence below approximately fifteen degrees. However, the amount of cross-coupling increases quite rapidly above this angle of incidence. The cross-coupling within the output optics structure may be eliminated by means of a suitable polarization filter, but the available filtered power decreases as the unfiltered cross-coupling increases. As the angle of incidence of each beam upon the output mirror increases, the power available at the detector diodes for each beam decreases. A calculated graph of power reduction factor, the ratio of power available at the detectors at a given angle of incidence to that available for the same beam normal to the mirror surface, is shown in FIG. 7 for the output structure described in the above-referenced U.S. Pat. No. 4,141,651. As may readily be seen, the power reduction factor falls rapidly for angles of incidences greater than approximately fifteen degrees. Hence, in accordance with one aspect of the invention, the angle of incidence of the beams in passages 108 and 110 to the partially transmitting mirror disposed upon face 122 is made to be fifteen degrees or less. Alternately stated, the angle between passages 108 and 110 is thirty degrees or less.

In systems operation, it is desirable that the waves of the four frequencies be centered symmetrically about the peak of the gain curve. To this end, a piezoelectric transducer 160 is provided to mechanically position the mirror on face 128 to adjust the total path length within laser gyro cavity 102 to properly center the four frequencies. Path length control 320 derives a signal for operating piezoelectric transducer 160 from detector diodes 145 and 146. These signals have an amplitude in proportion to the total amplitudes of the corresponding $\Delta f_1$ and $\Delta f_2$ signals. Control 320 generates the difference between these two amplitude related signals. The output difference signal of course has a zero amplitude when the waves of the four frequencies are properly centered upon the gain curve. The output difference signal is of one polarity when the four waves are off center in one direction and the opposite plurality when the waves are off center in the other direction. The average amplitude signals can be formed by known circuitry, the output of which is coupled to the input leads of piezoelectric transducer 160.

Still referring to the views of FIGS. 1, 3 and 4, electrodes for exciting the gaseous gain medium are disposed within passage 108. Preferably, center cathode electrode 22 is connected to the negative terminal of an external regulated power supply 310 while anode electrodes 32 and 42 are connected to the positive terminals. The cathode electrode is in the form of a short hollow cylinder capped by a hollow metal hemisphere at the end most distant from laser gyro block 102. It is attached by conventional means to the surface of gyro block 102 adjacent aperture 20. Positive electrodes 32 and 42 are in the form of metal rods extending into electrode apertures 30 and 40. With this configuration, the electron current flows outward toward electrodes 32 and 42 in two opposed directions. In this manner, because a beam traversing the passages in which the electrodes are located passes through equal lengths of current flow of opposite direction, the effects of drag on the beam caused by unequal current flow through the gaseous gain medium are substantially eliminated. However, because of manufacturing tolerances in the positions of the various electrodes, the distances between the negative and two positive electrodes in the two passages may not be precisely equal. To compensate for the inequality, electrodes 32 and 42 are connected to two independent positive terminals of supply 310, so that current flow between the positive electrodes and thereto adjacent negative electrode may be made unequal and thus compensate for the different drag effects.

The gaseous gain medium which fills passages 108, 110, 112 and 114 is supplied through gas fill aperture 106 from an external gas source. A mixture $^3$He, $^{20}$Ne and $^{22}$Ne in the ratio of 8:0.53:0.47 is preferred. Once all the passages have been filled, a seal 107 is applied to aperture 106 to contain the gas for sealed-off operation.

Figure 5:
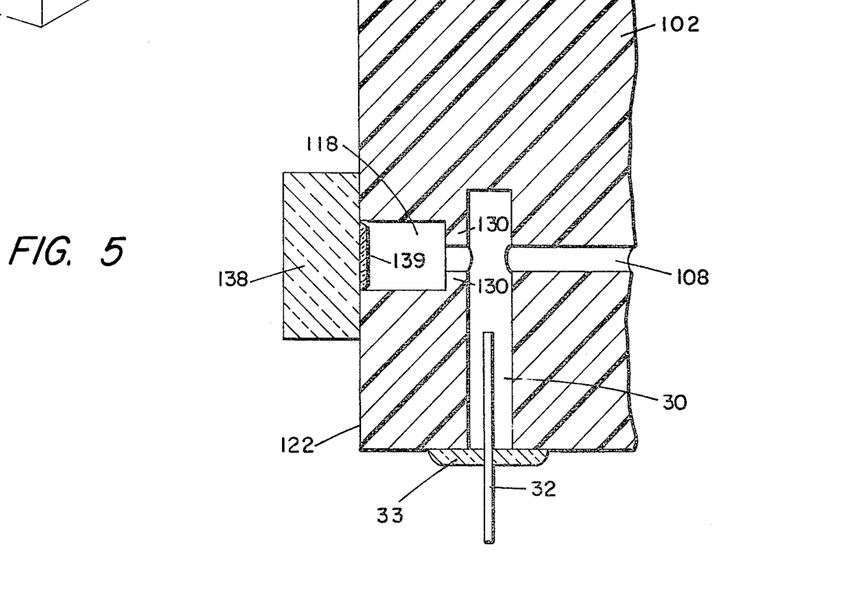
FIG. 5 is a cross-sectional view showing the internal construction of the system shown in FIG. 1 in the region of one of the terminal chambers and mirror substrate.

The details of construction of the laser gyroscope system in the region of one of the positive electrodes are shown in detail in the cross-sectional views of FIG. 5. Metal electrode 32, held in place by electrode seal 33, is positioned within electrode aperture 30. Electrode 32 extends somewhat more than half way from the surface of gyro block 102 to passage 108. Electrode aperture 30 intersects passage 108 preferably at a right angle. Terminal chamber 118 is formed into the surface of gyro block 102 upon which is positioned output optics structure 144. Terminal chamber 118 is cylindrical in shape having a diameter at least twice that of passage 108. Terminal chamber 118 and passage 108 are coaxial with one another. Because passage 108 extends slightly beyond electrode aperture 30 before intersecting with terminal chamber 118, a baffle 130 is formed between electrode passage 30 and terminal chamber 118. A similar arrangement is provided for electrode 42 by aperture 40, seal 43 and terminal chamber 119.

In prior art system, no baffle was provided. The terminal chamber extended directly from the electrode apertures out to the surface of the laser gyro block.

When the electrodes were excited, dust or other unwanted particles which may be produced such as by ion bombardment and sputtering of the laser gyro block would collect around the intersection of the electrode aperture and beam passageways. The suspended particles acted as scattering centers increasing the optical loss of the structure. In contrast, with the present invention it has been found that dust or other unwanted particles will not be suspended in the region of the intersection of electrode apertures, such as 30, and passage 108. Thus a potential source of drift is eliminated.

Figure 8B:
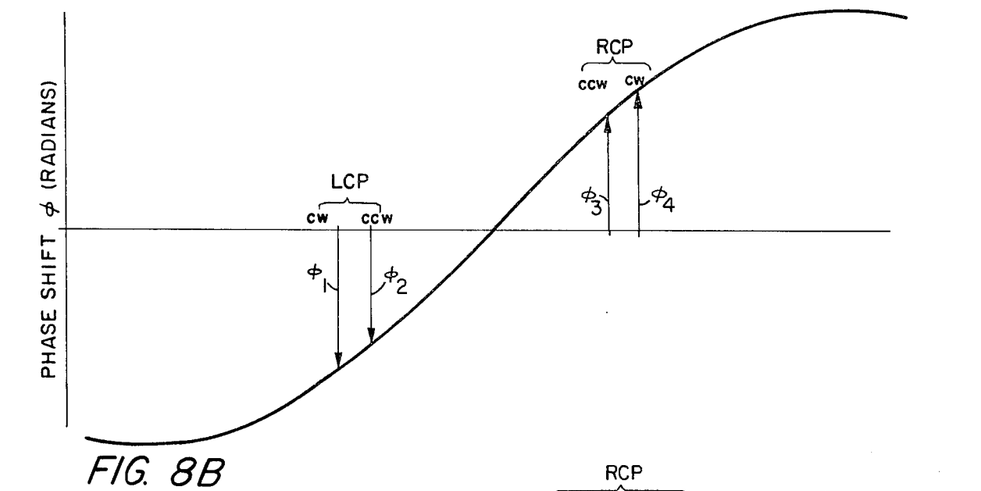
FIG. 8B is a graph showing the phase shift (dispersion) as a function of frequency corresponding to the gain medium of FIG. 8A.

As discussed above, by maintaining good circular polarization, the gyro eliminates all known sources contributing large amounts of drift. There is, however, an additional source that contributes a smaller amount of drift which must be compensated if the laser gyro is to be used in a high performance system. This remaining drift is due to dispersion, that is, a frequency dependent index of refraction associated with the gain of the medium used. For a He-Ne gain medium, the gain line is approximately Gaussian in shape due to Doppler broadening; the dispersion curve can be described as sigmoid. The dispersion curve expresses the amount of optical phase shift that a wave of a particular frequency will experience due to the presence of a gain medium. As can be seen in FIG. 8B, frequencies below center frequency $f_c$ experience a phase shift opposite to that of frequencies above center frequency $f_c$ resulting in all modes being shifted toward line center. This is the mode pulling effect. Since the dispersion curve is non-linear, the four modes of a differential gyro will be operating on points having different amounts of dispersion and correspondingly, referring to FIG. 8B, having different amounts of phase shift. $\Phi_1$ is the phase shift corresponding to $f_1$, $\Phi_2$ corresponds to $f_2$, $\Phi_3$ corresponds to $f_3$ and $\Phi_4$ corresponds to $f_4$. If the difference $(\Phi_2-\Phi_1)$ is different in quantity than the difference $(\Phi_4-\Phi_3)$, there will be a non-zero differential output at rest which depends on the shape of the dispersion curve, itself a function of many elements such as temperature, gain and pressure. As any one of these elements changes, this change will be reflected as a shift of the four modes across the dispersion curve which, due to its nonlinear nature, will result in a changing differential output. Thus, the gyro will have a drift in its output frequency which varies according to a variety of factors.

Figure 9:
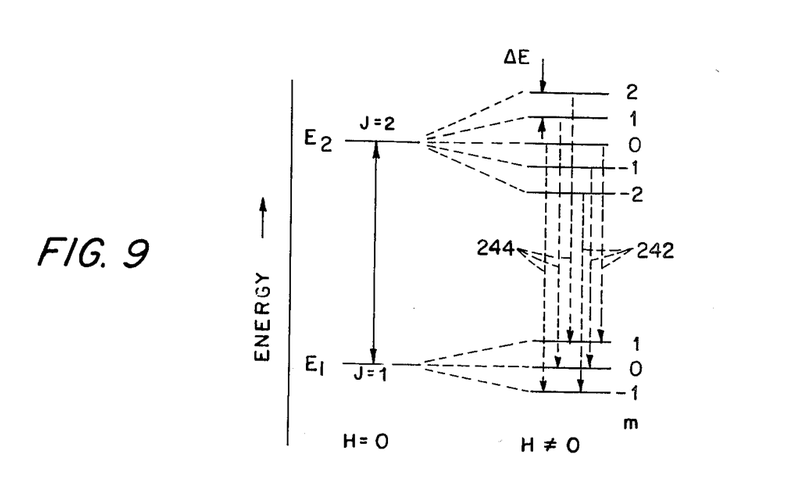
FIG. 9 is an energy level diagram showing the splitting of the energy levels in the presence of a magnetic field.

The gyro system of the present invention uses the Zeeman effect to eliminate the drift due to the gain medium dispersion. The Zeeman effect refers to the splitting of the spectral lines of the lasing gas into two or more components. This frequency splitting results in a splitting of the gain curve and its corresponding dispersion curve. The physical mechanism is the quantum mechanical phenomenon in which a magnetic field splits the atomic energy levels into several states which have different energies and which interact with waves of predetermined circular polarization states. This is illustrated in FIG. 9 where on the left side of the energy diagram there is shown a typical energy-state level in the presence of no magnetic field. In this case, the radiating frequency is $f_o=(E_2-E_1)/h$, where $E_2$ and $E_1$ are the two energy levels, and h is Planck's constant. The right side of the diagram shows how the energy levels are split in the presence of a magnetic field. Lines 242 show the energy level transitions corresponding to $\Delta m=+1$ that will give rise to one set of the radiating frequencies, such as the center frequency for split dispersion line 260, $f_+=f_0-gBH/h$. Lines 244 show the energy level transitions corresponding to $\Delta m=-1$ that give rise to the other set of radiating frequencies, such as the center frequency for split dispersion line 250, $f_-=f_0+gBH/h$, where g=Landé G-ratio or gyromagnetic ratio, B=Bohr magnetron and h=Planck's constant. The four circulating modes have different values of the change m of the magnetic quantum number m of the neon atom, as follows:

| Mode No. | Direction | Polarization | Delta m |
|---|---|---|---|
| 1 | clockwise | LCP | +1 |
| 2 | counter-clockwise | LCP | −1 |
| 3 | counter-clockwise | RCP | +1 |
| 4 | clockwise | RCP | −1 |

The Zeeman effect is both polarization and direction dependent. The reason for this is that the sense of rotation of the electric field vector of the light wave as measured about the magnetic field interacts with the spin of the electrons whose energy levels are split by the field. Thus, one of the resulting dispersion lines interacts with a RCP wave that travels in a parallel direction to the direction of the magnetic field and a LCP wave which travels in an anti-parallel direction, that is, opposite the direction of the magnetic field, while the other dispersion line interacts with a RCP wave travelling in a sense anti-parallel to the magnetic field vector and an LCP wave travelling in a direction in the same direction as the magnetic field.

Figure 8C:
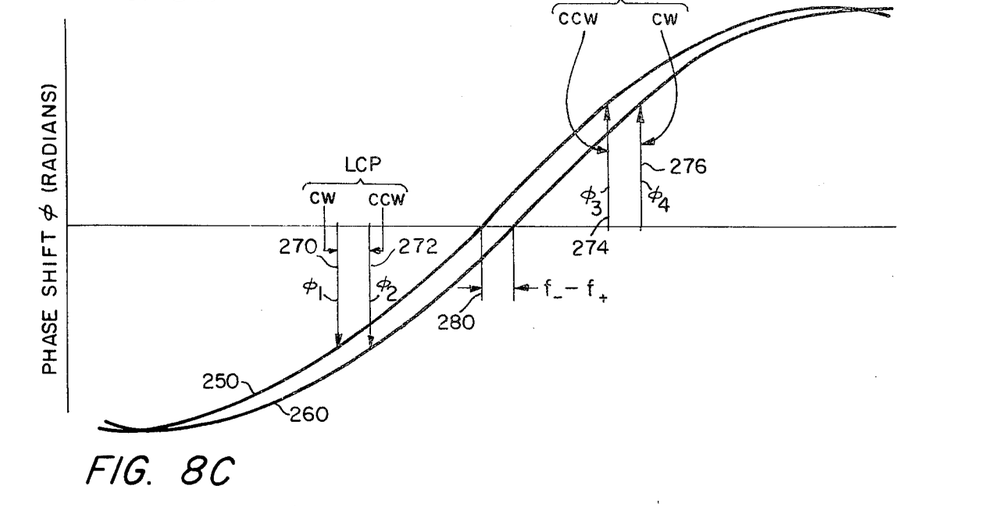
FIG. 8C is a graph showing the phase shift (dispersion) versus frequency of a laser medium in the presence of a magnetic field indicating the relative positions of the frequencies of the four beams within the system.

Since the values of $\Delta m$ correspond to different atomic transitions, these transitions are split by an amount equal to $2gBH/h$ by the Zeeman effect. Referring now to FIG. 8C, there is shown a diagram of the split dispersion curves and the corresponding phase shifts of the four modes of the gyro. If the magnetic field H is such that the $\Delta m=+1$ line is lower in frequency than the $\Delta m=-1$ line by an amount 280 equal to $(f_2-f_1)$ then we will have line 270 and line 272 equal in height, that is, the amount of phase shift provided to $f_1$ and $f_2$ will be equal. Similarly, line 274 and line 276 will be at the same height, with the result that the frequencies $f_3$ and $f_4$ will have a similar amount of phase shift. It can then be seen that as the four frequencies drift across the dispersion curve or the dispersion curve changes due to, e.g., temperature, the dispersion of mode 1 will always be equal to that of mode 2, and that of mode 3 will similarly be equal to that of mode 4. Thus, as external conditions create small changes in the operating frequencies, the net difference in a differential output will remain the same. To remove the dispersion drift, the magnetic field for the Zeeman effect must satisfy the following expression: Faraday bias=$2gBH/h$=(3.64 MHz/Gauss)H. This results in a gyro system capable of achieving a stability of the output frequency of the order of much less than one Hz.

Referring now to FIGS. 1–4, it can be seen that in the preferred embodiment the magnetic field necessary for Zeeman splitting of the dispersion curves is obtained by use of coils disposed around the passage that carry the lasing medium. Bores are drilled into gyro block 102 to provide passages 200, 210, 220 and 230 for the coils. Coils 202 and 212 are provided on one side of cathode 22 while coils 222 and 232 are provided on the other side of cathode 22 in order to provide Zeeman splitting throughout the lasing portion of the gyro path. Four sets of coils are used to provide a more uniform magnetic field to the lasing gas, however, any other arrangement that provides a component of the magnetic field to the lasing gas can be used. Coils 202, 212, 222 and 232 are disposed around passage 108. Preferably, all four coils are controlled by a single source to provide a current of such magnitude and polarity to generate a magnetic field in the passages for creating the splitting of the dispersion curves equal in magnitude to the splitting in frequency of the Faraday bias provided by Faraday rotator 156 and in the direction that removes the sensitivity of the waves to the gain medium.

It is preferable to control the amount of magnetic field that is generated for the Zeeman splitting in relation to the amount of Faraday bias provided by the Faraday rotator.

Referring now to FIG. 1, there is shown output optics structure 144 supporting diodes 145 and 146. Output optics structure 144 separates the LCP counter-rotating frequency pair from the RCP counter-rotating frequency pair with each pair being detected by a separate diode. For instance, diode 145 is used to provide a signal corresponding to $f_a$, the frequency difference ($f_2-f_1$) of the first frequency pair, while diode 146 is used to provide a signal correponding to $f_b$, the frequency difference ($f_4-f_3$) of the second frequency pair. The outputs of diodes 145 and 146 are connected to dispersion control 300. At rest, $f_a=f_b$ and each difference corresponds to the Faraday bias. In the presence of rotation, one of the two difference frequencies increases and the other decreases, the amount and sense of change being dependent on the direction and rate of rotation. Dispersion control 300 has conventional electronic circuitry to enable the forming of a signal representing the average of the two frequency differences and thus it measures the Faraday bias even under rotation. Further circuitry in dispersion control 300 provides a current to coils 202, 212, 222 and 232 as a function of this Faraday bias signal to create a magnetic field in passage 108 for splitting the dispersion curve by an amount equal to the frequency split obtained by the Faraday bias. The magnetic field needed for dispersion equalization is given by H=Faraday bias/2gBh=(Faraday bias in Hz)/($3.64 \times 10^6$) Oe, and the current used to produce it depends proportionally on the number of turns of the coils, as is well-known in the art.

It is found that the Faraday rotator of the present embodiment produces a Faraday bias having a characteristic that is inversely proportional to temperature. Through control 300, the magnetic field for the Zeeman splitting is generated as a function of the measured Faraday bias and thus the dispersion equalization is made independent of the temperature dependence of the Faraday bias. Control 300 generates a current whose amplitude is controlled as a function of a signal corresponding to the measured Faraday bias, through some proportionality constants accounting for both the relationship of the magnetic field, whose polarity depends on the sense of the coil windings, to the Faraday bias and the number of turns in the coil windings. A more detailed description of bias control electronics 300 is not needed, since the design of such control circuits is well-known in the art.

Other modifications to the described embodiments will be apparent to persons skilled in the art without departing from the spirit and scope of this invention. Accordingly, it is intended that this invention be not limited except as defined by the appended claims.

What is claimed:

1. In combination:

means, comprising a housing having a passageway therein, for providing a closed path for electromagnetic waves passing through such passageway;

a supporting shell disposed within the housing and aligned with a portion of the passageway;

means, attached to, and supporting by the shell and disposed in a portion of the passageway, for providing Faraday rotation to the electromagnetic waves;

means, attached to, and supported by the shell for absorbing electromagnetic waves, said absorbing means being disposed on at least one side of said Faraday rotation means, said absorbing means having a central region disposed in the passageway adapted to pass a substantial portion of said waves for tranmission through said rotation means and having an absorbing region displaced from the passageway; and said rotation means being further positioned to direct any portion of said waves reflected by the rotation means toward said absorbing region of the absorbin means.

2. The combination of claim 1 wherein:

said supporting shell comprises a low thermal expansion material having a plurality of stops; and said rotation means and said absorbing means are held in place against said stops by elastic means.

* * * * *